United States Patent
Stradi et al.

(10) Patent No.: US 9,963,370 B2
(45) Date of Patent: May 8, 2018

(54) APPARATUS AND A METHOD FOR THE DEHYDRATATION TREATMENT OF WASTE SLUDGE

(75) Inventors: Aristide Stradi, Soliera (IT); Domenico Altieri, Modena (IT); Gian Carlo Ferrari, Soliera (IT)

(73) Assignee: FERBUR LIMITED, Tortola (VG)

( * ) Notice: Subject to any disclaimer, the term of this patent is extended or adjusted under 35 U.S.C. 154(b) by 770 days.

(21) Appl. No.: 13/805,817

(22) PCT Filed: May 31, 2011

(86) PCT No.: PCT/IB2011/052390
§ 371 (c)(1),
(2), (4) Date: Dec. 20, 2012

(87) PCT Pub. No.: WO2011/161568
PCT Pub. Date: Dec. 29, 2011

(65) Prior Publication Data
US 2013/0098765 A1 Apr. 25, 2013

(30) Foreign Application Priority Data

Jun. 22, 2010 (IT) .............................. MO2010A0186

(51) Int. Cl.
*C02F 11/00* (2006.01)
*B30B 9/12* (2006.01)
(Continued)

(52) U.S. Cl.
CPC ............ *C02F 11/006* (2013.01); *B30B 9/121* (2013.01); *B30B 9/128* (2013.01); *B30B 9/163* (2013.01);
(Continued)

(58) Field of Classification Search
CPC ....... C02F 11/006; C02F 11/12; C02F 11/125; F26B 2200/18; F26B 3/34; F26B 7/00; B30B 9/121; B30B 9/128; B30B 9/163
See application file for complete search history.

(56) References Cited

U.S. PATENT DOCUMENTS

| 1,133,967 A | * | 3/1915 | Illig | ....................... B01D 61/56 |
| | | | | 204/629 |
| 2,104,197 A | * | 1/1938 | Johansen | ................ B30B 9/121 |
| | | | | 100/145 |

(Continued)

FOREIGN PATENT DOCUMENTS

| DE | 12 47 982 | 8/1967 |
| EP | 0 553 783 | 8/1993 |

(Continued)

OTHER PUBLICATIONS

International Search Report dated Oct. 7, 2011, corresponding to PCT/IB2011/052390.

*Primary Examiner* — Ibrahime A Abraham
*Assistant Examiner* — Salil Jain
(74) *Attorney, Agent, or Firm* — Young & Thompson (57) ABSTRACT

An apparatus for treating waste sludge includes an outer container casing, internally hollow, an inner body coaxial with the outer casing, a compacting and dehydrating chamber, inside the outer container casing and along which sludge to be treated runs, an inlet zone for supplying sludge to the chamber, an outlet zone for unloading treated sludge, movement elements for the sludge, cooperating with the inner body, which promote compaction and advancement of the sludge from the inlet zone to the outlet zone; a container net connected to a negative pole of a control unit to form a cathode, and the inner body connected to a positive pole to form an anode. A method of treating sludge includes the promoting the continuous advancement and compaction of sludge inside a compression chamber between the anode and cathode, and establishing a difference in potential in order to subject the sludge to an electrical field.

27 Claims, 9 Drawing Sheets

(51) Int. Cl.
  *B30B 9/16*  (2006.01)
  *C02F 11/12* (2006.01)
  *F26B 3/34*  (2006.01)
  *F26B 5/14*  (2006.01)
  *F26B 7/00*  (2006.01)

(52) U.S. Cl.
  CPC ............ *C02F 11/12* (2013.01); *C02F 11/125* (2013.01); *F26B 3/34* (2013.01); *F26B 5/14* (2013.01); *F26B 7/00* (2013.01); *F26B 2200/18* (2013.01)

(56) References Cited

U.S. PATENT DOCUMENTS

| | | | |
|---|---|---|---|
| 2,754,750 A | | 7/1956 | Borrow |
| 2,764,011 A | * | 9/1956 | Richter .................. B01F 7/162 162/243 |
| 3,506,562 A | * | 4/1970 | Coackley ............. B01D 33/073 204/629 |
| 4,761,897 A | * | 8/1988 | Tazaki .................. B01F 15/068 34/180 |
| 2002/0036175 A1 | * | 3/2002 | Held ......................... C02F 1/46 210/609 |
| 2005/0092694 A1 | * | 5/2005 | Christopherson ....... B30B 9/121 210/769 |
| 2009/0050580 A1 | | 2/2009 | Takao et al. |
| 2009/0057204 A1 | * | 3/2009 | Bennington, II .... B01D 29/035 209/156 |
| 2009/0114540 A1 | * | 5/2009 | Lee ....................... C02F 11/123 204/600 |

FOREIGN PATENT DOCUMENTS

| | | |
|---|---|---|
| EP | 0 882 677 | 12/1998 |
| FR | 517 751 | 5/1921 |
| FR | 973 716 | 2/1951 |
| WO | 97/07065 | 2/1997 |

\* cited by examiner

APPARATUS AND A METHOD FOR THE DEHYDRATATION TREATMENT OF WASTE SLUDGE

The present invention relates to a method and an apparatus for the treatment of waste sludge.

In particular, the present invention finds application in the controlled disposal of sludge arising from industrial processes (e.g. biological tomato, vegetables etc.), or in the reuse of sludge arising from agricultural workings or from biological water purification treatments, following regenerative chemical, biological and mechanical treatment of the same.

BACKGROUND OF THE INVENTION

As a result of industrial and/or purification treatments, large quantities of sludge solutions are produced, containing solid material that needs to be disposed of or reused.

These solutions may contain sand, soil, cellulose, residues of material deriving from working with or washing machinery or tanks, or biological decantation sludge.

The bulk and the weight of similar waste materials or materials for reuse are considerable; it has therefore been necessary to study solutions for reducing the volume and the weight so as to be able to transport and store them at the lowest possible cost while they await final disposal or, as the case may be, reuse for different purposes.

The solution currently adopted to obviate this problem is to reduce the water content of the sludge material.

There are various methods and techniques used for dehydrating the sludge, which undergoes treatments of physical, chemical, mechanical or thermal type.

Some of the treatments used, for example, are drying, centrifuging, depressurising or again pressing.

One technique in current use involves filling special moulds under pressure with the sludge material in order to force the water out through filtration fabrics, to reduce the water content.

This process is long and laborious because only a limited and predetermined quantity of sludge can be treated in each cycle. In fact, it is necessary to load the sludge which is to be dehydrated, and start up the pressurising machinery. In a given period of time it is possible to process only a small quantity of sludge residue.

The efficiency of this process, furthermore, is not ideal, since it produces dehydrated sludge with a percentage of dry matter (d.m.) which is still fairly low, around 30-33%.

The cycle thus entails various interruptions of the dehydrating process, which enables only a small quantity of sludge material to be treated per unit of time, besides entailing high processing and maintenance costs. Alternatively, the sludge to be treated is transported on belts and run through rollers, which press the sludge, reducing the moisture content. Besides not being particularly efficient, these machines are extremely bulky and need to be attended.

Alternatively, centrifuging can be used, but this yields a d.m. content which is still very low, 22-25% d.m.

SUMMARY OF THE INVENTION

In this context, the technical task at the root of the present invention is to propose a method and an apparatus for the treatment of sludge following mechanical or sedimentation treatments, the above being aimed at obtaining a much higher percentage of d.m., with reduced costs compared with other systems.

In particular, it is an object of the present invention to make available a method and an apparatus for the treatment of sludge which is efficient and which makes it possible to treat considerable quantities of sludge with contained costs.

In addition, a further object of the present invention is to introduce a method and an apparatus for the treatment of sludge which make it possible to obtain a dry matter percentage of 50-70%.

The declared technical task and the specified objects are substantially achieved by a method and an apparatus for the treatment of sludge, comprising the technical characteristics set forth in one or more of the attached claims.

BRIEF DESCRIPTION OF THE DRAWINGS

Additional characteristics and advantages of the present invention will become more readily apparent from the indicative, and hence non-limiting, description of a preferred but not exclusive embodiment of a method and an apparatus for the treatment of sludge, as illustrated in the accompanying drawings in which.

DETAILED DESCRIPTION OF THE PREFERRED EMBODIMENTS

With reference to the mentioned figures attached, no. 1 indicates an apparatus for the treatment of sludge comprising an outer container casing 2 which is internally hollow and an inner body 3 coaxial with the outer casing 2.

Inside the casing 2, the apparatus further comprises a compacting and dehydrating chamber 4, along which the sludge to be treated runs. Upstream of this chamber 4, therefore at a first end 2a of the outer casing 2, there is an inlet zone 5, preferably equipped with a hopper, for supplying the sludge F to be treated, while downstream of the chamber 4, therefore at a second end 2b of the casing 2, there is an outlet zone 6 for unloading the treated sludge to the outside of the apparatus.

The apparatus 1 is also provided with suitable movement means 7, cooperating with the inner body 3, which promote the compacting and advancement of the sludge F from the inlet zone 5 to the outlet zone 6.

Filter means 10 are arranged inside the casing 2, delimiting the compacting and dehydrating chamber 4, and are provided with at least one container net 11*a,b* which is connected electrically to a negative pole of a control unit to form a cathode C.

The inner body 3 on the other hand is electrically connected to a positive pole of a control unit to form an anode A.

A potential difference is established between said anode and said cathode which has the object of subjecting the sludge to be treated to an electrical field capable of creating an electro-osmotic process.

In this way, to put it very briefly, the sludge, in fact, crosses the compacting and dehydrating chamber 4 which is comprised, laterally to the overall direction of advancement, between an anode A and a cathode C by virtue of the presence of which the sludge is subjected to an electro-osmosis treatment which brings about its dehydratation to where, depending on the conditions, dry matter (d.m.) can reach 50-75% of the total.

At least one collection chamber 8 is provided for liquids and gases expelled from the sludge during treatment. This collection chamber 8 is formed inside the casing 2 adjacent to at least one part of the surface of the filter means (10) in the space inside the outer casing 2. A certain degree of depression is preferably generated in the chamber 8.

The filter means 10 are located between said liquid and gas collection chamber 8 and the compacting and dehydrating chamber 4 along which the sludge runs. The filter means 10, being permeable to water, are capable of preventing the passage of solid particles. In particular they comprise a filter possessing porosity, capable of allowing the electro-osmotic process.

The container net 11*a,b* separates the filter means 10 from the liquid and gas collection chamber 8*a,b*.

The electro-osmotic phenomenon, together with the phenomena of electrolysis, electrophoresis and others (for example the creation of voltaic arcs) brings about dehydratation of the sludge.

The water and gas derived from the electro-osmotic process of the sludge are collected inside a suitable liquid and gas collection chamber 8, from which they are forcefully sucked (which further favours the process) and possibly treated to yield compounds which could be useful in industry and/or agriculture.

The filter means 10 have a siliceous nature and exhibit a structure of their own which renders them permeable to water and gas, but prevents the passage of solid particles.

In particular the inlet zone 5 is positioned at a first end 2*a* of the outer casing 2 and the outlet zone is located at a second end 2*b* of the same casing.

Figure 1:
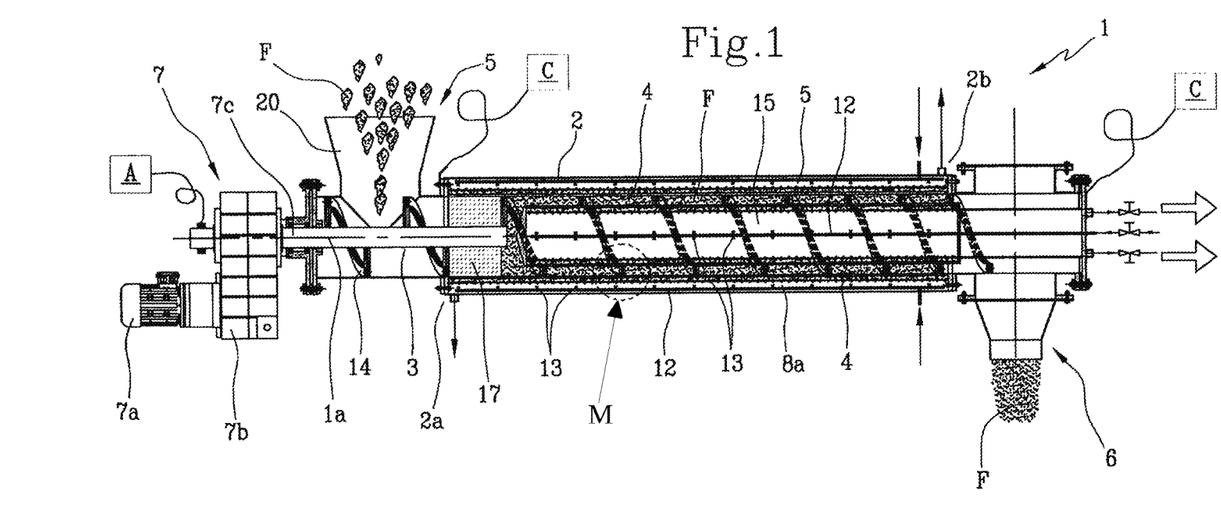
FIG. 1 represents a partially-sectioned lateral view of a first configuration of an apparatus for the treatment of sludge in accordance with the present invention.
Figure 1A:
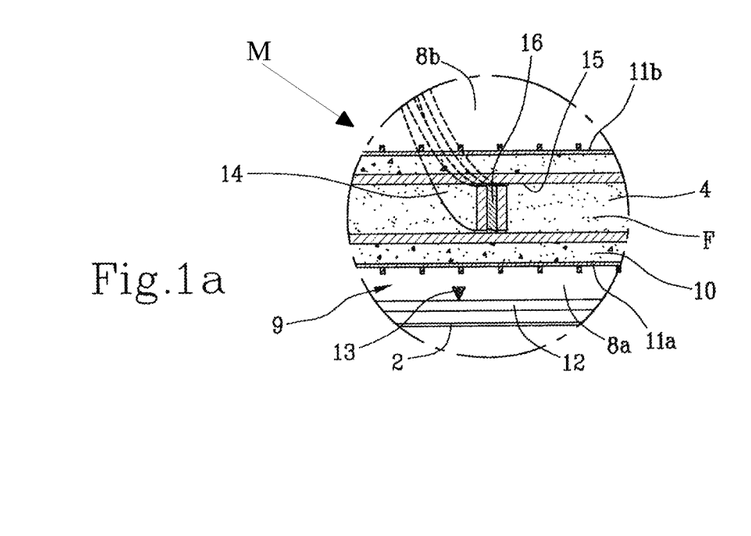
FIG. 1a represents an enlargement of a detail of FIG. 1 indicated by the letter "M"

In FIG. 1 it may be noted that between the inlet zone 5 and the container net created in cylindrical form 11*a,b*, there is a first stretch 17 of compacting and dehydrating chamber 4 which functions as a zone for static compacting of the sludge; here the sludge stands temporarily while waiting to be pushed onto the impeller 14 in the compacting and dehydrating chamber 4 proper or dynamic zone.

This static compacting zone 17 has volumetric dimensions per unit of length greater than does the compacting and dehydrating chamber 4 or dynamic zone.

The inner body 3 comprises an impeller 14, set in rotation by movement means 7, which is electrically connected to the positive pole of a control unit, not shown in the attached drawings, in order to function as an anode.

Said impeller 14 preferably has the special feature of having a variable pitch, decreasing from the inlet zone 5 to the outlet zone 6. This fulfils the purpose of keeping the material under treatment compacted, which (material) along the route from the inlet to the outlet undergoes a progressive loss of volume and mass exactly corresponding to the mass of water of which it is deprived as a result of the electro-osmotic process. The typical action of the screw also has the function of producing an important effect, of remixing, on the advancing material (sludge).

The movement means 7 comprise an electrical gear reducer 7*a* which powers a motion transmission shaft 7*c* connected to the impeller 14.

The impeller 14 rotates inside the compacting and dehydrating chamber 4.

At least one container net 11*a* is arranged outside the filter means 10 and has a cylindrical shape coaxial with the outer casing 2. Outside the container net 11*a* a liquid and gas collection chamber 8*a* is provided. The filter means 10 substantially abut against the inner wall of the container net 11*a* which performs the mechanical function of containment.

A second container net 11*b* is provided on the inner side with filter means 10, made up of a second siliceous filter, against which it abuts. Inside this container net, a second collection chamber 8*b* is provided for liquids and gases expelled from the sludge during treatment.

The container nets (11) 11*a,b*, too, are connected to the negative pole of the control unit to function as a cathode C.

A hydraulic circuit 12 is also provided, equipped with a plurality of nozzles 13 for moistening the filter means 10. This has the purpose of facilitating the electro-osmotic process by moistening the filter in order to allow electro-osmosis to be started and maintained.

In the first embodiment illustrated, the impeller 14 which, forming part of the body 3 functions as an anode, has an annular shape and operates inside the compacting and dehydrating chamber 4, this too being of annular shape.

A plurality of anti-wear skates 16 are arranged in discrete positions along the perimeter profile of the impeller 14, also with the function of electrically insulating the anode (represented by the impeller 14) from the surfaces of the filter means 10, located inside and outside the impeller 14.

The insulation of the impeller 14 from the filter means is alternatively implemented by means of longitudinal insulating battens 15, preferably partially inserted into the body of the filter means 10 and partially projecting from the surfaces thereof.

In the embodiment illustrated, the outer casing 2 features a horizontally-developing longitudinal axis.

Figures 2, 2A:
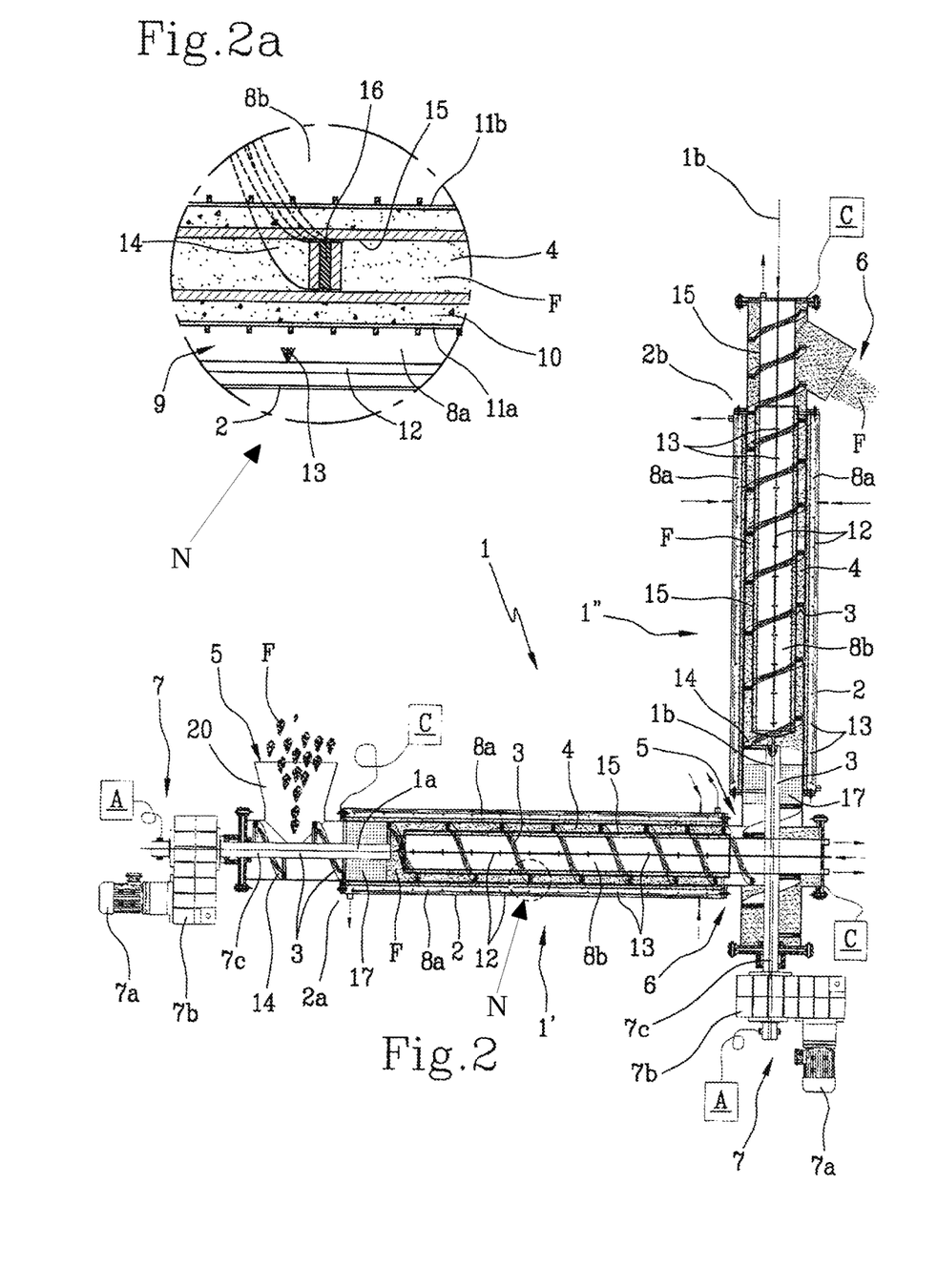
FIG. 2 illustrates a partially sectioned lateral view of a second configuration of an apparatus for the treatment of sludge in accordance with the present invention.
FIG. 2a represents an enlargement of a detail of FIG. 2 indicated by the letter "N"

The embodiment illustrated in FIG. 2 features a first tract having a slightly inclined horizontally-developing axis in order to enable the excess water to drain out, and a second tract 1″ having a vertically-developing axis 1*b*. The outlet zone 6 of the first tract 1′ coincides with the inlet zone 5 of the second tract 1″. Structurally the two tracts, one almost horizontally-developing and the other vertically-developing, have the same characteristics as the first embodiment illustrated. The presence of the vertical tract makes it possible to improve the process generally because it improves the maintenance of the compaction of the material (sludge) being treated, using the favourable action of the force of gravity. The weight of the material itself also acts to compress the material downwards. This action is added to that of the variation in pitch of the impeller 14 which, besides, rotates fairly slowly.

By actually exploiting the positive effect of gravity as just described above, an embodiment is provided according to which the apparatus has an overall development consisting only of vertical tracts arranged in a cascade, where from the outlet zone 6 of a vertical tract 1" (obviously with the exclusion of the last in the chain), the material, or sludge, already partially treated, is simply conveyed to the inlet zone 5 of the subsequent tract 1".

In operation the sludge to be treated, at 15-25% d.m. (dry matter as a percentage by weight of the total) is introduced into the inlet zone via a hopper, and from there, by means of a suitable transport means (screw, conveyor belt, raedler) is fed to the compacting and dehydrating chamber 4.

The sludge is transported initially towards the static compacting zone 17, where the electro-osmosis process begins, since from here onwards the sludge crosses the electrical field produced by the cathode and the anode. The sludge, subjected to an electrical field between the impeller 14 of the screw (anode A) and the outer and inner container nets 11$a,b$ (cathode C), set up in Jhonsons profile (net in trapezoidal profile which favours outflow of the liquid and prevents reabsorption, besides having considerable mechanical strength and corrosion resistance), releases water through the interposed filter means 10. The processes just described generate a quantity of gas (H1, O2, NH3) and other gaseous products that are extracted, collected and ducted to the outside through suitable nozzles and an aspiration and filtration circuit.

The sludge continues its journey propelled by the screw 14 which, as we said earlier, has a decreasing pitch which allows the sludge itself to be compacted and thus allows electrical conductivity between anode and cathode to be kept constant.

The movement imparted by the impeller 14 is of translational and rotational type with radial and longitudinal thrust, which allows the sludge itself to be mixed, preventing stratification of the parts with different d.m. values (thixotropic effect), and thus maintaining electrical conductivity between sludge and filter at a constant value. The composition of the two motions, rotational and translational, brings about a global helical movement, with a pace of advance much greater than the pace of the means which causes it, with compression towards the outside due to centrifugal force.

The process of electro-osmosis is thus increased by the geometry of the annular structure of the compacting and dehydrating chamber 4 which provides a double filtration: towards the outside and towards the inside.

In order to allow a difference of potential between impeller and filter (and therefore between anode and cathode), it is necessary for them to be insulated from each other: this is achieved, as we said earlier, with an insulating skate 16 formed on the impeller, separating the impeller from the filter.

Furthermore, in order to avoid the rotation of the impeller 14 being able to abrade and therefore wear the filter 10, battens 15 of steel or insulating material are provided on which the impeller 14 rests which, at the most, allow abrasion of the skate 16 itself or of the batten 15 (interchangeable), but not of the filter, which at this point is not subject to mechanical abrasion stresses.

In the case of the apparatus of the embodiment of FIG. 2, after a first cycle of passing through the first horizontal device according to the process just described, the sludge continues its route, thrust by the impeller 14, as far as the second device and then as far as the second impeller placed vertically. Here the sludge recommences the same process as described above, but following a vertical route. The force of gravity assists the compaction of the sludge.

According to another embodiment, the inner body 3 comprises, in place of the "annular" impeller 14, an actual screw 18 set in rotation by the movement means 7. The screw 18, together with the body 3, is therefore electrically connected to the positive pole of the control unit to function as an anode. In this case, too, the movement means 7 comprise an electrical gear reducer 7$a$ which powers a motion transmission shaft 7$c$ axially connected to said screw 18.

Figure 3:
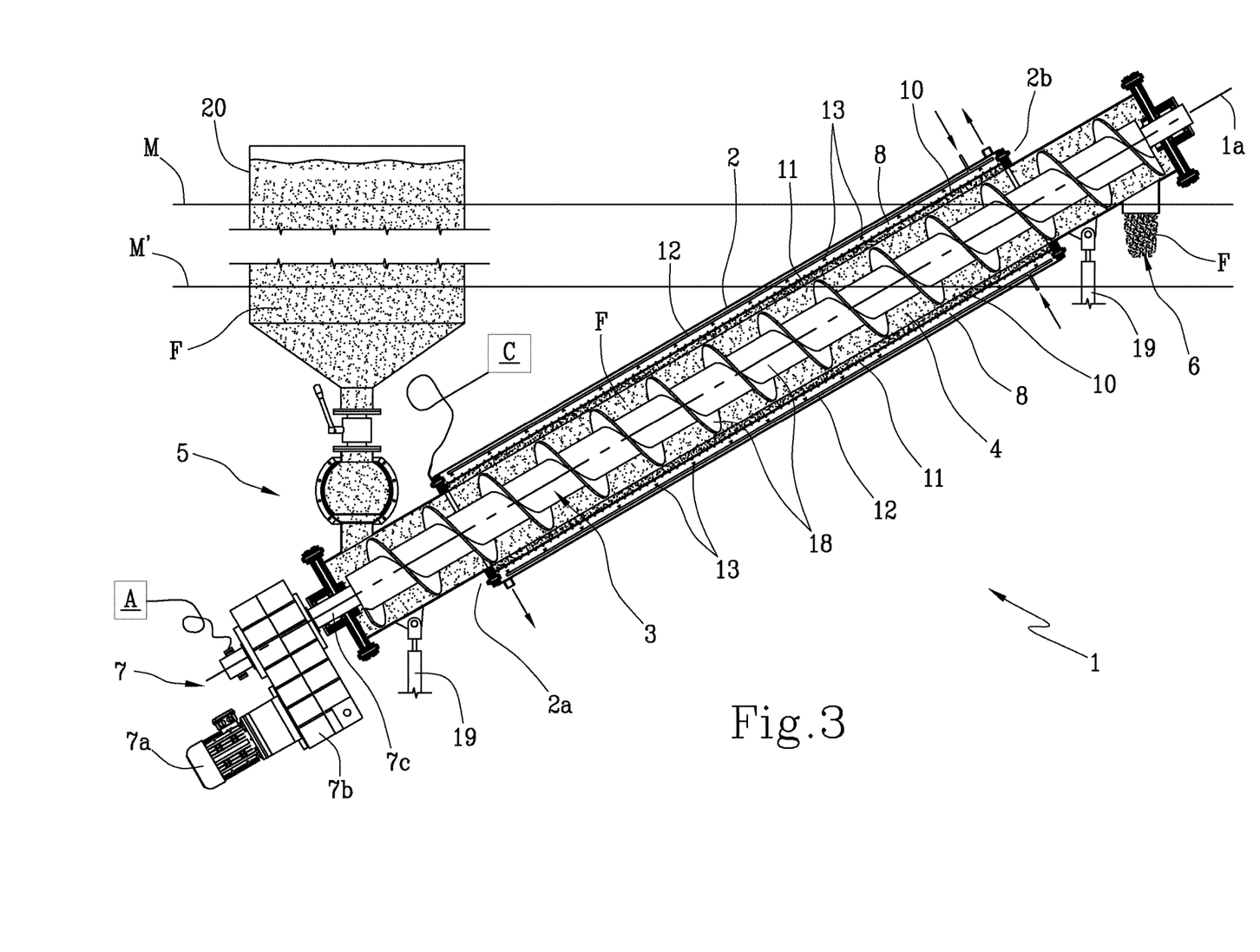
FIG. 3 illustrates a partially sectioned lateral view of a third configuration of an apparatus for the treatment of sludge in accordance with the present invention.

An example of such an embodiment is shown in FIG. 3 in which, compared with the embodiments previously explained, the casing 2 and all the parts associated with it feature a longitudinal axis 1$a$ inclined with respect to the horizontal by an angle comprised between 10° and 45° and in any event adjustable in such a way that the outlet zone 6 is at a higher level than the inlet zone 5.

The inclination of apparatus 1 is preferably adjustable in such a way that the outlet zone 6 is at a higher level than the inlet zone 5.

To permit this adjustment, feet 19 are provided which are adjustable by actuators arranged for the purpose.

The operation of the apparatus in accordance with this third configuration is similar to the operation of the apparatus according to the previous configurations.

Advantageously, there is a silo 20 above the inlet zone 5, which is filled with sludge of a density of 2-3% of d.m. up to the maximum level M which, by the law of communicating vessels, corresponds to the lesser level of M' (M≤M'), the maximum level of free outflow by decantation.

The screw 18 is made to rotate slowly (<1 rpm) and thrusts the supplied sludge into the compacting and dehydrating chamber 4 as far as the outlet zone 6. The compacting and dehydrating chamber 4, in this case, is constructed between the screw 18 and the interior of the outer casing 2.

Continuous voltage is supplied between anode A and cathode C so that the sludge, subjected to an electrical field between screw 18 (anode A) and container net 11, set up as Jhonsons profile (cathode C), releases a quantity of water through the interposed siliceous filter.

In this case, too, the processes described above generate a quantity of gas (H1, O2, NH3) and gaseous products that are extracted through suitable nozzles by an aspiration and filtration circuit.

The reduction in water and other components brings about a thickening of the sludge which, when it reaches a certain density (because of the increase in percentage dry matter) causes greater friction of the sludge on the impeller, the sludge being evacuated by the screw 18.

The density of the evacuated sludge depends on the inclination of the screw: the greater the inclination of the screw, the greater must be the density of the sludge through being evacuated.

The process is performed continuously in time and does not need to be attended.

When a minimum level M" is reached inside the silo 20, it is necessary to load the sludge into the silo, while when the sludge F in the silo 20 reaches the maximum level M, loading is stopped, to prevent free outflow. Furthermore the plant, which is supplied with continuous voltage, can be interfaced with photovoltaic panels to obtain very modest running costs compared with other thickening and/or dehydrating systems. Polyelectrolytes are not required because there is no need for an increase in the flocculence of the sludge to reduce the surface area and therefore the water attached to the surface.

Figure 4:
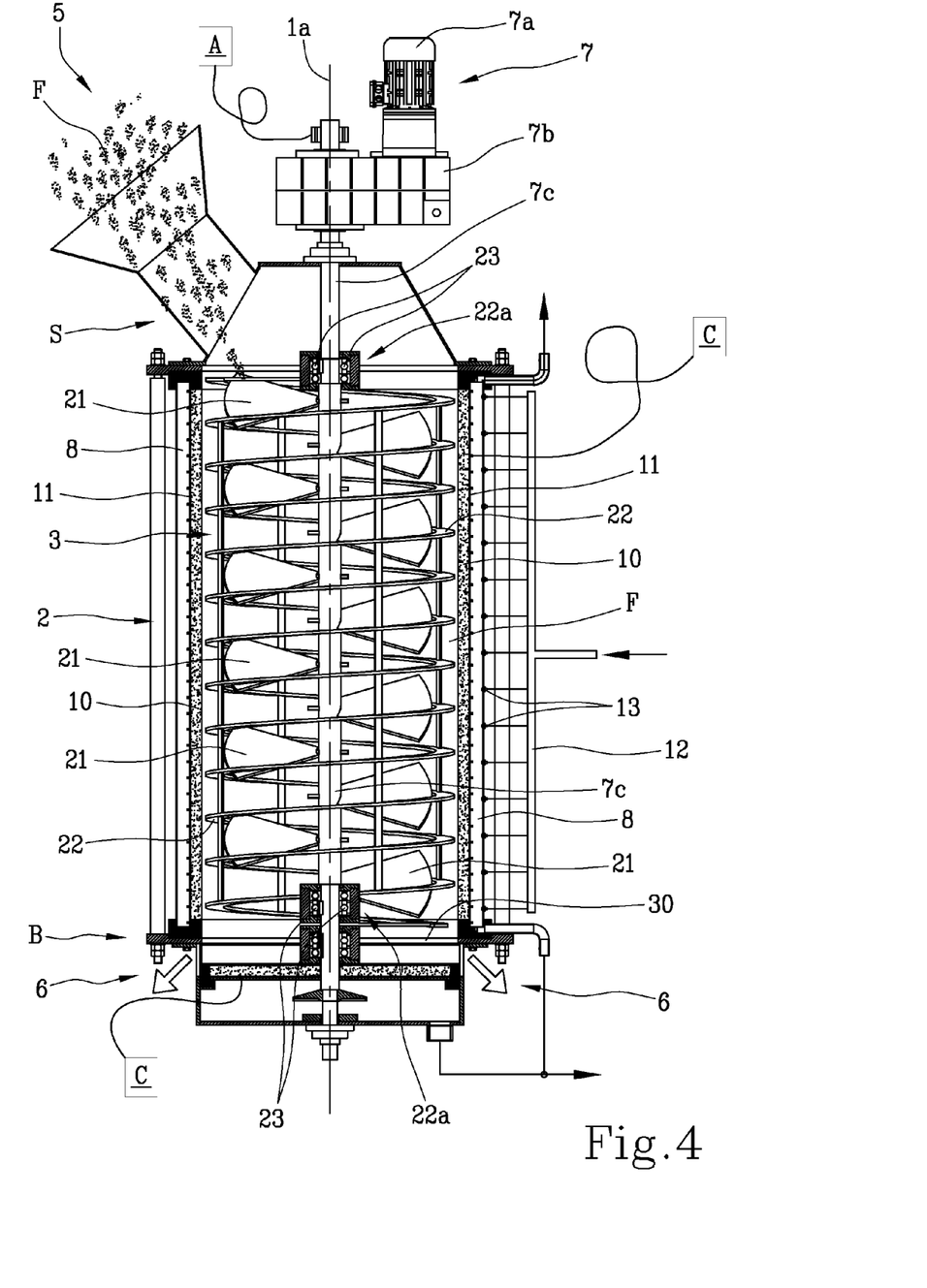
FIG. 4 shows a partially sectioned lateral view of a fourth configuration of an apparatus for the treatment of sludge in accordance with the present invention.
Figure 4A:
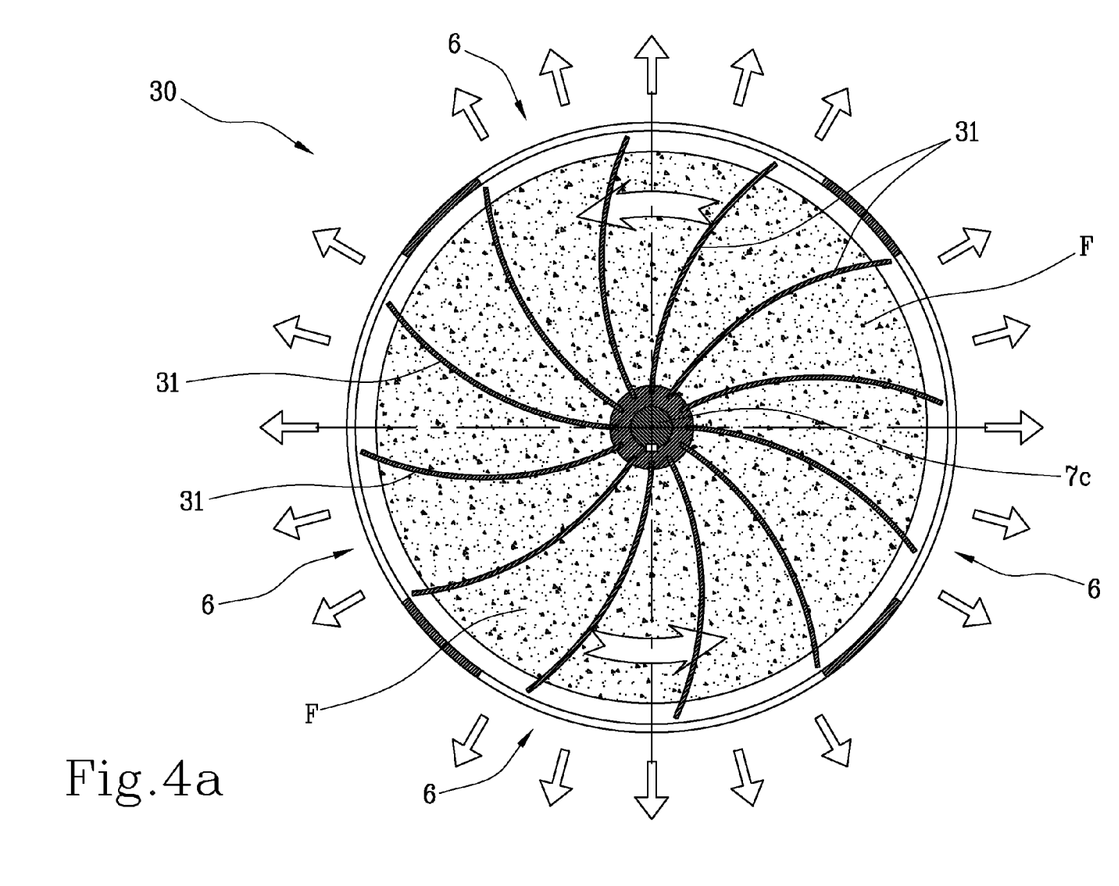
FIG. 4a illustrates a plan view of a section of the apparatus shown in FIG. 4 at or near the leader line of reference number 10 in FIG. 4.

According to a further embodiment, shown in FIG. 4, the casing 2 has a vertical axis and the inner body 3 is movable inside the cylindrical compacting and dehydrating chamber 4 in order to energetically mix the sludge to be treated and comprises, with axis 1a positioned vertically, a motion transmission shaft 7c which features, along its axial development, a plurality of blades 21 together with a helically-developing coil 22, inside which is inserted the motion transmission shaft 7c. The latter, together with the components connected to it, functions as an anode.

In particular the helically-developing coil 22 is connected to the motion transmission shaft 7c, at respective ends 22a, on free wheels 23 which enable rotation of the coil 22 in one direction while preventing rotation thereof in an opposite direction.

The inlet zone 5 is placed at the top S of the apparatus, and said outlet zone 6 is located on the bottom B.

A circular rake 30 is furthermore provided, equipped with a plurality of radial paddles 31 with logarithmic development, located on the bottom wall (B) and keyed to the motion transmission shaft (7c). The rake 30, connected to the positive pole to function as an anode, is located in proximity to the outlet zone 6 in such a way as to convey the treated sludge towards the outside. The possibility of varying the inclination of the blades makes it possible to act differently on the sludge, depending on the physical-chemical characteristics thereof.

The blades 21 are kept in constant movement (at very low speed), so as to exert on the sludge a continuous pressure which makes it possible to maintain the electrical conductivity between anode A and cathode C.

The anode A consists of the helically-developing coil 22 which has a short pitch, so as to obtain the greatest contact area with the sludge, and to ensure that the anode-filter field affects the hollow cylinder formed by the circular ring of the coil 22.

Normally, when the plurality of blades 21 thrusts the sludge towards the bottom, the coil 22 is stationary, because it is keyed onto free wheels 23 which prevent its movement in a clockwise direction.

At regular intervals of time it is possible to reverse the direction of rotation of the central blades 21, in this way also driving the outer coil 22, since the free wheels 23 transmit motion in an anticlockwise direction to the latter, further compacting the sludge in contact with the impeller and lift the sludge in contact with the blades.

The direction of rotation of the blades 21 is then reversed once more and the initial situation is restored, in which the coil 21 is stationary.

Once again, after a certain interval of time (which can be predetermined, either depending on the current consumed or on the time), the direction of rotation of the blades 21 is reversed, blades which tend to lift the sludge, while the coil 22 thrusts it downwards. In this way the outer ring of sludge, affected by the anode, moves downwards: this is the most dehydrated part because it is located between anode and cathode, and is driven from below by means of the rake; if the impeller thrusts the sludge downwards and the blades thrust it upwards, there is a transposition of the two layers, with evacuation of the sludge, of the circular ring affected by the impeller; if the direction of rotation is reversed, the blades rebuild the circular ring of sludge.

Simultaneously, the rake 30 comes into operation, this too being keyed onto the motion transmission shaft 7c by means of a free wheel 23 which prevents it from moving in a clockwise direction but not in an anticlockwise direction.

This combination allows which the shaft itself to function as anode when it is stationary and as sludge evacuator by means of the rake when it is rotated.

Once the sludge has been discharged, the direction of rotation of the blades 21 is reversed once more and the rotation of the coil 22 is automatically stopped, restoring the initial conditions.

The coil 22 is integral with the motion transmission shaft 7c for the blades 21, but the motion is transmitted by a one-way bearing, which allows rotation in one direction only.

A level indicator placed inside the compacting chamber 4 indicates when the sludge level has been restored.

Other similar apparatuses can be set up in cascade with this one, so as to obtain the desired dry matter percentage: the evacuated sludge is introduced into another container equivalent to this one, in cascade, which, starting from a lower d.m. percentage, will reach a higher d.m. percentage and so on until the desired d.m. percentage is achieved.

Figure 5:
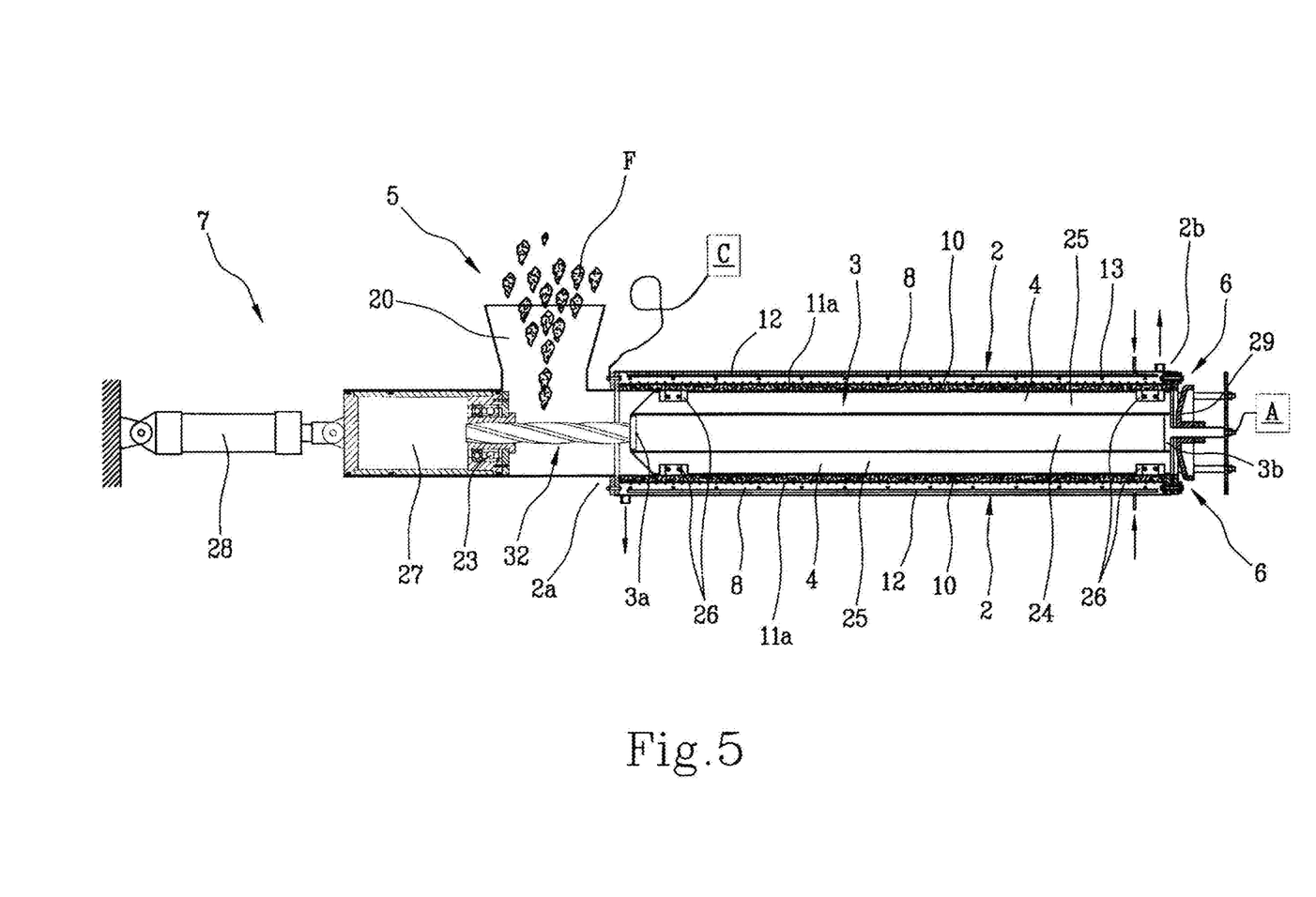
FIG. 5 shows a partially sectioned lateral view of a fifth configuration of an apparatus for the treatment of sludge in accordance with the present invention.
Figure 5A:
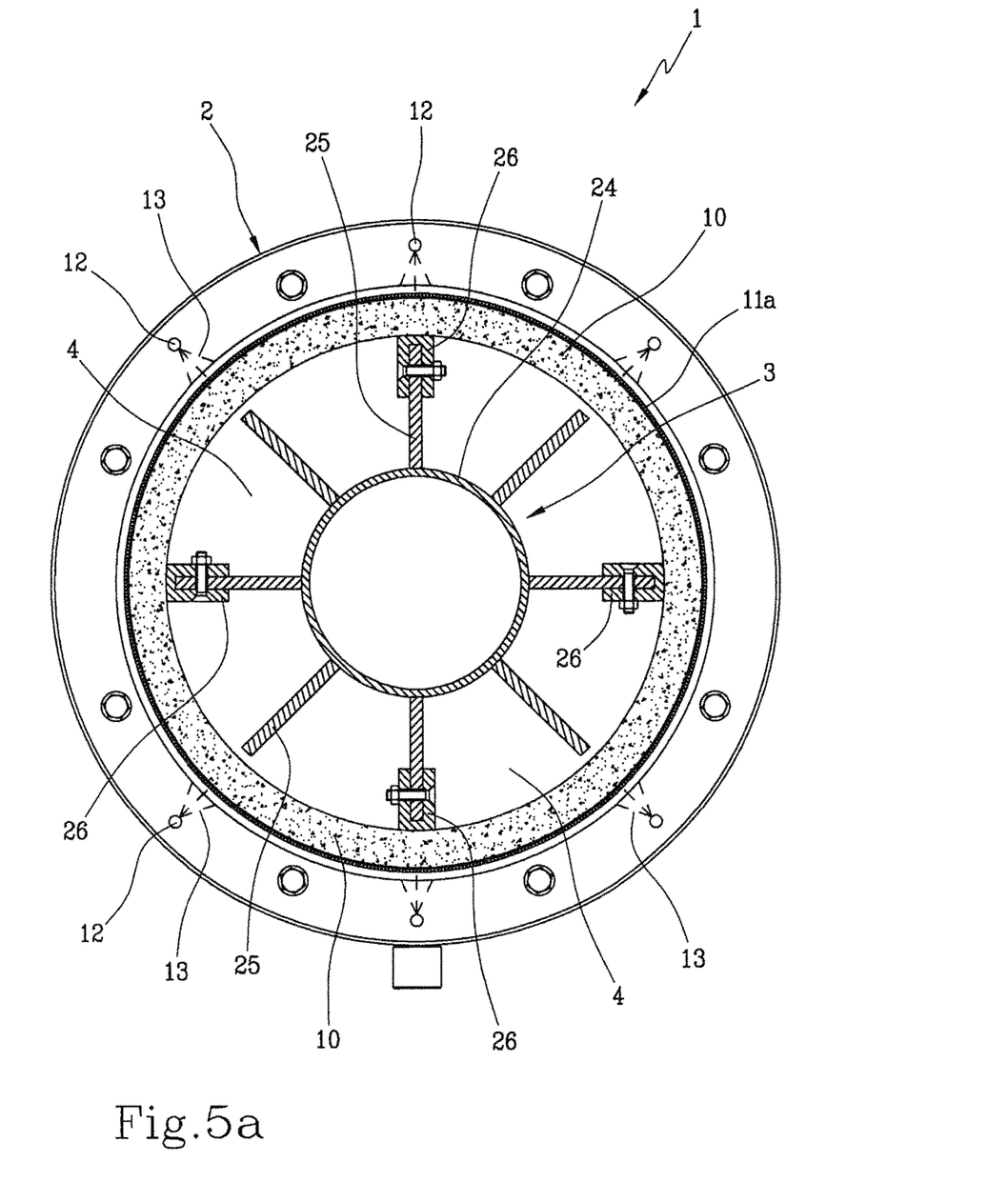
FIG. 5a shows a section along the marked plane V-V in FIG. 5.
Figure 6:
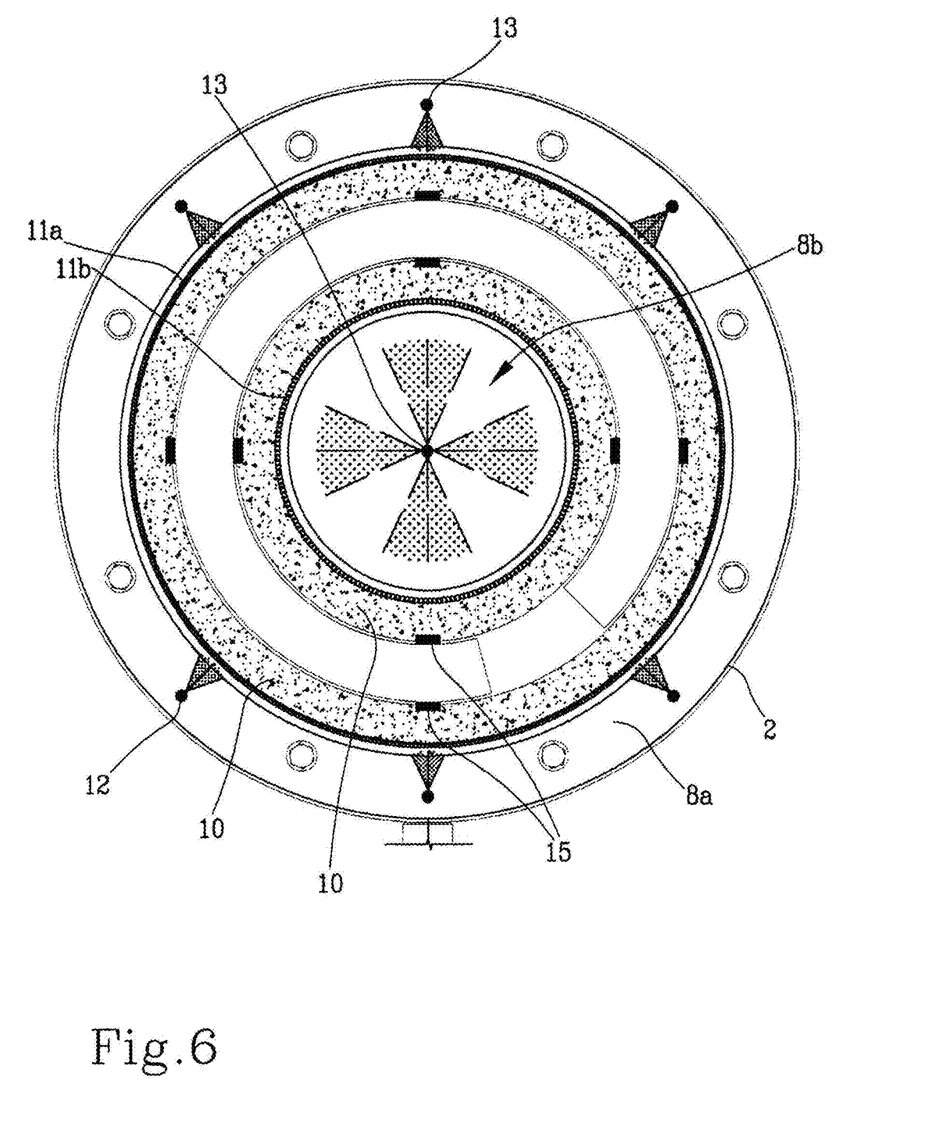
FIG. 6 shows a section along the marked plane I-I in FIG. 1.

In the embodiment of FIG. 5, the inner body 3 extends inside the outer casing 2 and features a first end 3a located in proximity to the inlet zone 5 and a second end 3b located at the outlet zone 6. It comprises furthermore a shaft 24 which functions as anode, equipped with one or more radial wings 25, extending longitudinally and in helical form along its axial development.

The shaft 24, with the outer container casing 2, forms the compacting and dehydrating chamber 4.

Spacer plugs or longitudinal battens 26 in insulating material are mounted on each wing 25, or fixed so as to separate filter from anode, in order to electrically separate the shaft functioning as an anode and the wall of the filter means 10.

The movement means for the shaft 24 comprise a compacting piston 27 for the sludge, connected to a linear actuator 28, preferably a hydraulic cylinder.

The compacting piston 27 is connected to the shaft 24 by means of a screw mechanism with a spiral 32 and free wheel by means of which the translating movement of the piston generates, at the advancing stage only, a rotation movement of the shaft 24. In this way the intermittent advance of the material being treated inside the compacting and dehydrating chamber 4 also has a rotation component which makes it possible to achieve an adequate remixing of the material.

In the return phase the shaft does not rotate because of the presence of a free wheel mechanism connected to the spiral 32 which ensures that the spiral rotates, but not the shaft.

A similar result can obviously be obtained with other mechanisms, of known type, which act directly by setting the shaft in rotation on command.

Also provided is a counter-pressure adjustable closing cone 29, located in proximity to the outlet zone 6 of the material being treated, to regulate the opening of the discharge section for the sludge and the internal pressure of the compacting and dehydrating chamber 4.

In operation, the sludge at a dry matter percentage of 15% or more is introduced from the inlet zone 5, through a hopper 20, into the apparatus 1.

The sludge is thrust into the compacting and dehydrating chamber 4 by a suitable piston 27 towards the static compacting zone 17 where the electro-osmosis process begins.

The piston 27 is moved by the hydraulic cylinder 28 connected to a suitable hydraulic control unit, not shown.

The sludge, subjected to an electrical field between the inner body 3, formed by the finned shaft 24, 25 (anode A)

and the outer container net 11a (set up as Jhonsons profile) (cathode C), releases a quantity of water through the interposed siliceous filter. In this case, too, the processes described above generate a quantity of gas (H1, O2, NH3) and gaseous products which are extracted through suitable nozzles by an aspiration and filtration circuit.

The sludge continues its journey pushed, intermittently, by the piston 27 and by the introduction of new material. During this advance the material tends to dry out as a result of the electro-osmosis.

The outflow of water from the sludge tends to reduce the electrical conductivity and therefore, to maintain it unchanged or at least at acceptable levels, it is advantageous to increase the pressure on the sludge itself: this is achieved through a special adjustable compression cone 29 with adjustable closure, which regulates the opening in the sludge outlet zone.

In this way adjustments are made to the pressure which it is desired to obtain inside the dehydrating chamber.

In order to allow a difference of potential between the shaft 24 and the wings 25 and the filter 10 (therefore between anode and cathode), it is necessary for them to be insulated from each other: this is achieved with suitable spacer plugs 26, in insulating material, which separate the wings 25 from the filter 10 and the net which constitutes the cathode.

Figure 7:
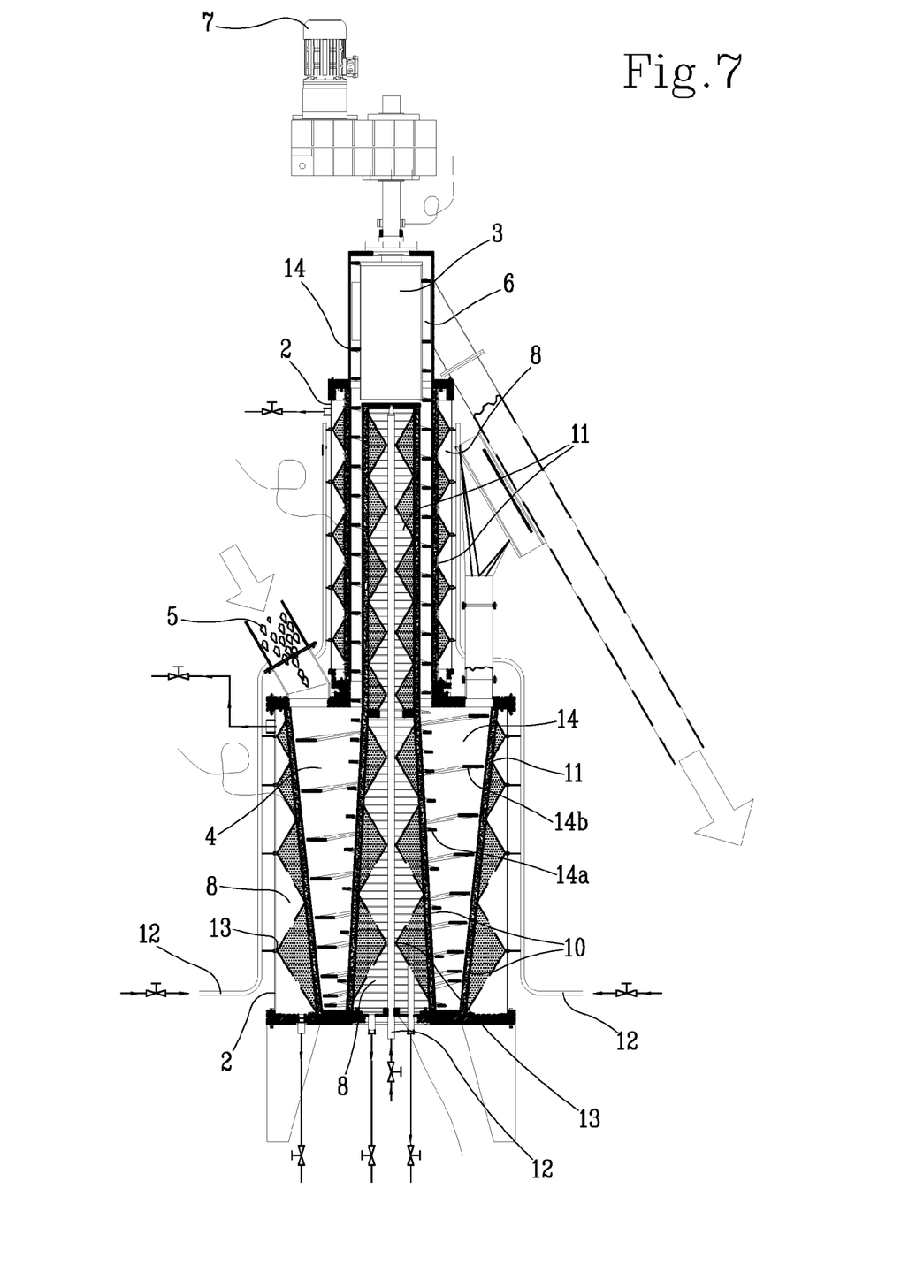
FIG. 7 represents a partially-sectioned lateral view of a further configuration of an apparatus for the treatment of sludge in accordance with the present invention.

In a further embodiment illustrated in FIG. 7, the compacting and dehydrating chamber 4 has a section in the shape of a circular ring, and is delimited at its periphery by filter means 10, which are arranged to form conical walls to the compacting and dehydrating chamber 4. Inside the compacting and dehydrating chamber 4 there are arranged an outer impeller 14a and an inner impeller 14b which are integral, but wound in opposite directions, and connected to the positive pole of a control box to form an anode. An outer impeller 14a operates in proximity to the wall of the filter means 10 arranged on the outside, and the inner impeller 14b operates in proximity to the walls of the filter means 10 arranged inside the compacting and dehydrating chamber 4, which is closed at one end at which the walls formed by the filter means 10 are closest together. The inlet zone 5 and outlet zone 6, arranged concentrically, are located on the same side, opposite to the end at which the compacting and dehydrating chamber 4 is closed.

The compacting and dehydrating chamber 4 has a vertical axis and features a closed end at its lower part. The inlet zone 5 and the outlet zone 6 are located in the upper part.

The sludge at ≥15% d.m. is introduced into the hopper 5 via a transport means or directly, enters from above and is drawn downwards by the impeller 14b. Simultaneously, it is compressed against the outer wall by the downwards movement, by the centrifugal force of the impeller 14b and by the reduction in the pitch, and this corresponds to an entry into operation of the electro-osmosis with a related outflow of water and gas.

The electro-osmotic flow is thus facilitated, together with electrolysis, electrophoresis and other phenomena (for example the creation of photovoltaic arcs). This causes dehydratation of the sludge and a reduction in the quantity of $H_2O$ and of d.m. so that, depending on the conditions, they may reach reductions of 50-70%.

Besides the release of $H_2O$ through the siliceous filter, a quantity of gases ($H_2$, $O_2$, $NH_3$) is generated, which are extracted through suitable nozzles.

Once the sludge has reached the bottom, pushed by the impeller 14b, it continues its journey towards the top from the impeller 14a, which moves integrally with the impeller 14b, being connected to it by connecting arms, further continuing the process of electro-osmosis.

Since the outflow of $H_2O$ from the sludge tends to dry the sludge, the pressure is increased on the sludge itself through the reduction in the pitch of the impellers. This occurs from the top towards the bottom through the impeller 14b and from the bottom towards the top through the impeller 14a.

In order to allow an adequate difference of potential between the impeller 14 and the filters 10 (and therefore between anode and cathode), special spacer plugs are used, made of insulating material (16).

Having arrived at the top the sludge is drawn vertically along a circular wall and expelled from the discharge port into another similar machine.

After the first dehydratations, if necessary a screw can be used with a pusher which exerts a large pressure in order to obtain the dehydration necessary for achieving the desired result.

In its various embodiments which have been described, the invention implements a method for treating sludge comprising the stages of supplying sludge-to-be-treated to an apparatus 1 in accordance with one or more of the claims; of promoting the advancement of the sludge inside a compacting and dehydrating chamber 4 located between an anode and a cathode; and of subjecting the sludge to an electrical field generated by a potential difference between the anode and the cathode.

In particular the method comprises the stage of subjecting the sludge to be treated to a process of electro-osmosis to dehydrate the sludge.

The invention makes it possible to treat considerable quantities of sludge with continuous processes, the sludge being dehydrated until it reaches 50-70% dry matter.

The electro-osmotic process makes it possible to dehydrate the sludge effectively: this process, combined with the continuous compaction of the material, ensures a considerable reduction in the water content.

Interruptions to the dehydration process are furthermore avoided, so that remarkable quantities of sludge can be treated rapidly, efficiently and with contained costs.

The invention claimed is:

1. An apparatus for treating waste sludge, comprising:
    an hollow outer container casing extending along a longitudinal length of the apparatus, an interior of the outer container casing forming a compacting and dehydrating chamber that extends along the longitudinal length of the apparatus through which the waste sludge to be treated runs;
    an inner body inside the outer container casing, extending through the compacting and dehydrating chamber and coaxial to the outer container casing;
    an inlet zone that supplies the waste sludge to be treated to a receiving portion of the compacting and dehydrating chamber;
    an outlet zone, at an exit portion of the compacting and dehydrating chamber, that unloads sludge that has been treated by the compacting and dehydrating chamber;
    a mechanical device that, in cooperation with the inner body, causes advancement, mixing and compacting of the waste sludge from the inlet zone to the outlet zone; and
    a filter disposed inside the outer container casing, surrounding and delimiting an outer perimeter of the compacting and dehydrating chamber, wherein the inner body comprises at least an impeller that is rotated by the mechanical device, said impeller being electrically connected to a positive pole in order to operate as an anode, wherein the mechanical device comprises an electrical gear reducer, the electrical gear reducer being in mechanical connection with a motion transmission shaft that, in turn, is connected to the impeller, wherein a first container net is arranged outside the filter such that the filter abuts against an inner wall of the first container net, wherein a second container net is provided on an inner side of the filter, such that the inner side of the filter abuts against the second container net, wherein the filter is a siliceous filter, wherein a hydraulic circuit is provided, with a plurality of nozzles, for moistening the filter, wherein the first and second container nets are in electrical connection with a negative pole in order to operate as a cathode, and wherein a potential difference established between the anode and the cathode subjects the waste sludge to be treated to an electrical field in order to realize an electro-osmotic process.

2. The apparatus of claim 1, wherein the filter is permeable to water, and further configured to prevent passage of solid particles.

3. The apparatus of claim 2, wherein the filter exhibits porosity, and is configured to enable the electro-osmotic process.

4. The apparatus of claim 1, wherein the impeller has a variable pitch.

5. The apparatus of claim 1, further comprising:
a plurality of anti-wear elements arranged in discrete positions along a perimeter of the impeller, so as to electrically insulate the impeller from surfaces of the filter.

6. The apparatus of claim 5, wherein the electrical insulation of the impeller from the filter is obtained by means of insulating longitudinal battens partially inserted in the filter and partially projecting from the surfaces of the filter.

7. The apparatus of claim 1, wherein the first container net and the second container net are coaxial to the outer casing, and the impeller is arranged to rotate internally in the compacting and dehydrating chamber.

8. The apparatus of claim 1,
wherein the compacting and dehydrating chamber is peripherally delimited by the filter which is arranged so as to realize a plurality of conical walls,
wherein the impeller comprises both an outer impeller and an inner impeller, both provided inside the compacting and dehydrating chamber, said outer impeller and said inner impeller being connected to the positive pole such that both the outer and inner impellers operate as the anode,
the outer impeller and the inner impeller being wound in opposite directions,
the inner impeller operating inside a first of the conical walls of the filter, and the outer impeller operating outside a second of the conical walls of the filter, and
the compacting and dehydrating chamber being closed at a first end, at which the walls of the filter are closer to one another than at an opposite second end,
wherein the inlet zone and the outlet zone are arranged concentrically to each other, and
wherein the inlet zone and the outlet zone are both located opposite to the first end at which the compacting and dehydrating chamber is closed.

9. The apparatus of claim 8, wherein the compacting and dehydrating chamber has a vertical axis, and the first end that is closed is at a lower part of said vertical axis.

10. The apparatus of claim 1, wherein the inlet zone is positioned at a first end of the outer container casing and the outlet zone is located at a second end of the outer container casing.

11. The apparatus of claim 1, wherein the hollow outer container casing, the inner body, the inlet zone, the outlet zone, the mechanical device, and the filter form a first tract that is downwardly inclined in order to enable outlet of water, the first tract being in fluid communication with a second tract comprised of a second hollow outer container casing, a second inner body, a second inlet zone, a second outlet zone, a second mechanical device, and a second filter all arranged as in the first tract, where the second tract is arranged so that the waste sludge runs along a vertical axis.

12. The apparatus of claim 11, wherein an outlet zone of the first tract coincides with an inlet zone of the second tract.

13. The apparatus of claim 1, wherein the impeller of the inner body comprises an Archimedes screw that is set in rotation by the mechanical device, the Archimedes screw being electrically connected to the positive pole such that the Archimedes screw set can function as an anode.

14. The apparatus of claim 1, wherein the longitudinal length of the apparatus is inclined with respect to a horizontal axis by an angle comprised between 10° and 45°, the angle being adjustable such that the outlet zone is at a higher level than the inlet zone.

15. The apparatus of claim 14,
wherein the impeller of the inner body comprises a helical spiral,
wherein the motion transmission shaft is delimited by the helical spiral, and
wherein the spiral functions as the anode.

16. The apparatus of claim 15, wherein the spiral is connected to the motion transmission shaft,
the spiral being attached at respective ends thereof on free wheels which enable rotation of the spiral in a direction while preventing rotation thereof in an opposite direction.

17. The apparatus of claim 1,
wherein the container casing is oriented along a vertical axis, and
wherein the apparatus further comprises:
a circular rake with a plurality of radial paddles, said rake being located on a bottom wall (B) of the container casing and attached to the motion transmission shaft,
the rake being located in proximity of the outlet zone such as to convey the sludge that has been treated towards an outside environment.

18. The apparatus of claim 1, wherein the motion transmission shaft functions as the anode, having two or more wings extending from an axis about which the shaft rotates.

19. The apparatus of claim 18, further comprising:
at least two spacer plugs made of an insulating material and mounted on each wing in order to electrically separate the shaft from the filter.

20. The apparatus of claim 18, wherein the mechanical device comprises a compacting piston that compacts the waste sludge, said piston being connected to a linear actuator.

21. The apparatus of claim 20, further comprising:
a counter-pressure-adjustable closing cone located in proximity of the outlet zone, for regulating an opening of the outlet zone and the internal pressure of the compacting and dehydrating chamber, the compacting piston being connected to the shaft by means of a screw mechanism with a spiral by means of which the translating motion of the piston further generates a rotation motion of the shaft.

22. The apparatus of claim 20, wherein the linear actuator is a hydraulic cylinder.

23. A method for treating waste sludge comprising the steps of:
supplying the waste sludge to an apparatus as in claim 1;
causing advancement of the waste sludge internally in the compacting and dehydrating chamber located between an anode and a cathode; and
subjecting the waste sludge to an electrical field generated by a potential difference between the anode and the cathode.

24. The method of claim 23, further comprising:
subjecting the waste sludge to be treated to an electro-osmotic process in order to dehydrate the waste sludge.

25. An apparatus for treating waste sludge, comprising:
a hollow outer container casing;
an inner body which is coaxial to the outer container casing;
a compacting and dehydrating chamber inside the outer container casing and extending along a longitudinal length of the apparatus through which the waste sludge to be treated runs;
an inlet zone that supplies the waste sludge to be treated to a receiving portion of the compacting and dehydrating chamber;
an outlet zone, at an exit portion of the compacting and dehydrating chamber, that unloads sludge that has been treated by the compacting and dehydrating chamber;
a mechanical device inside the inner body that, in cooperation with the inner body, causes advancement, mixing and compacting of the waste sludge from the inlet zone to the outlet zone; and
a filter disposed inside the outer container casing and delimiting the compacting and dehydrating chamber, the filter being provided with at least a container net which is connected to a negative pole in order to operate as a cathode, and at least the inner body being connected to a positive pole in order to operate as an anode,
wherein a potential difference established between the anode and the cathode subjects the waste sludge to an electrical field in order to realize an electro-osmotic process,
wherein the compacting and dehydrating chamber is peripherally delimited by the filter which is arranged so as to realize a plurality of conical walls,
wherein an outer impeller and an inner impeller are provided inside the compacting and dehydrating chamber, said outer impeller and said inner impeller being connected to the positive pole,
the outer impeller and the inner impeller being wound in opposite directions,
the inner impeller operating inside a first of the conical walls of the filter, and the outer impeller operating outside a second of the conical walls of the filter, and
the compacting and dehydrating chamber being closed at a first end, at which the walls of the filter are closer to one another than at an opposite second end,
wherein the inlet zone and the outlet zone are arranged concentrically to each other, and
wherein the inlet zone and the outlet zone are both located opposite to the first end at which the compacting and dehydrating chamber is closed.

26. An apparatus for treating waste sludge, comprising:
a first tract and a second tract, each tract comprising:
an hollow outer container casing;
an inner body inside and coaxial to the outer container casing;
a compacting and dehydrating chamber inside the outer container casing and extending along a longitudinal length of the apparatus through which the waste sludge to be treated runs;
an inlet zone that supplies the waste sludge to be treated to a receiving portion of the compacting and dehydrating chamber;
an outlet zone, at an exit portion of the compacting and dehydrating chamber, that unloads sludge that has been treated by the compacting and dehydrating chamber;
a mechanical device inside the inner body that, in cooperation with the inner body, causes advancement, mixing and compacting of the waste sludge from the inlet zone to the outlet zone; and
a filter disposed inside the outer container casing and delimiting the compacting and dehydrating chamber, the filter being provided with at least a container net which is connected to a negative pole in order to operate as a cathode, and at least the inner body being connected to a positive pole in order to operate as an anode,
wherein a potential difference established between the anode and the cathode subjects the waste sludge to an electrical field in order to realize an electro-osmotic process, and
wherein the longitudinal length of the first tract is inclined upward to a horizontal axis in order to enable outlet of water, and the longitudinal length of the second tract extends along a vertical axis.

27. The apparatus of claim 26, wherein the outlet zone of the first tract coincides with the inlet zone of the second tract.

* * * * *